Oct. 28, 1930.  P. H. GUNDAL  1,779,878
ENGINE
Filed May 14, 1928  3 Sheets-Sheet 1
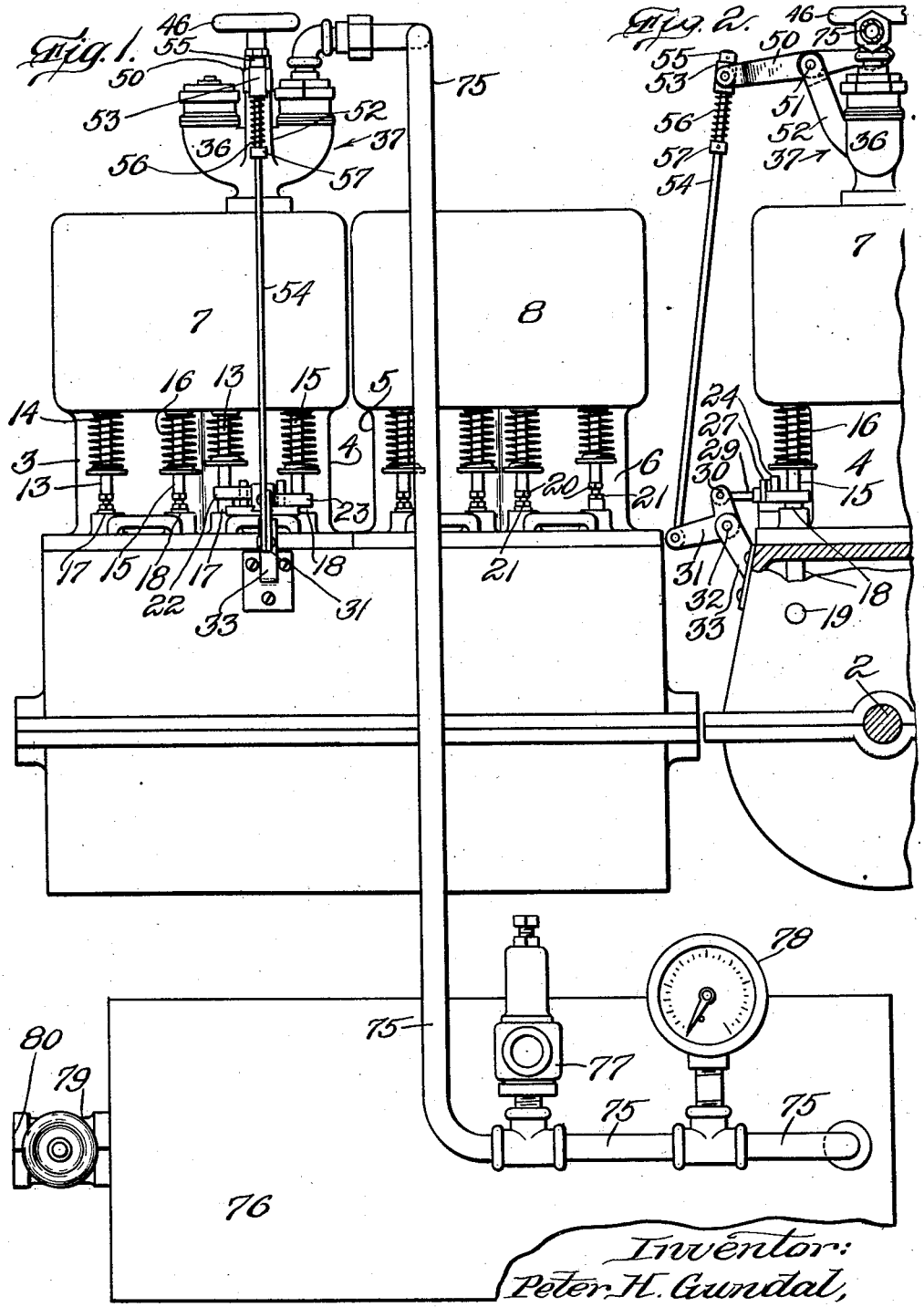

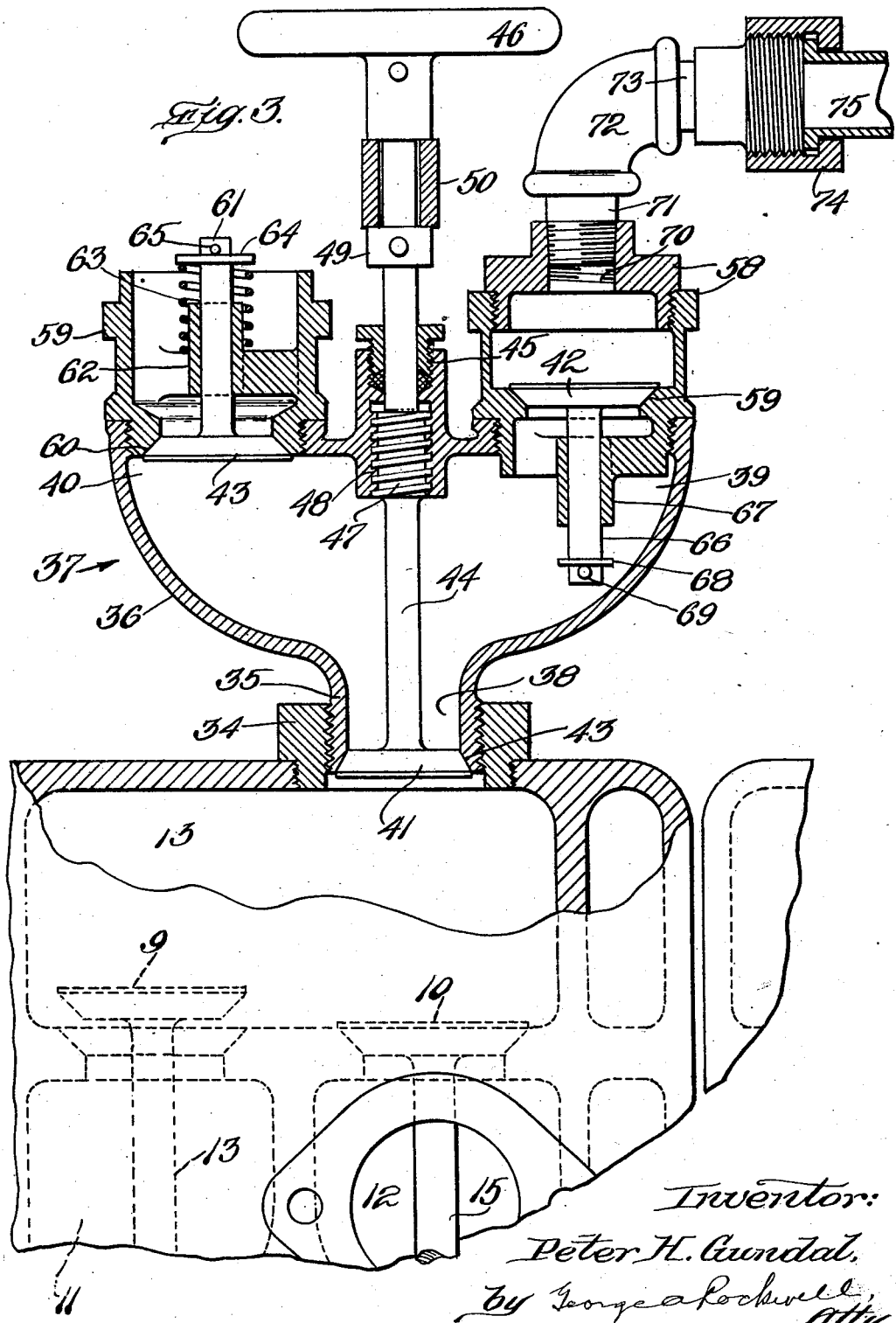

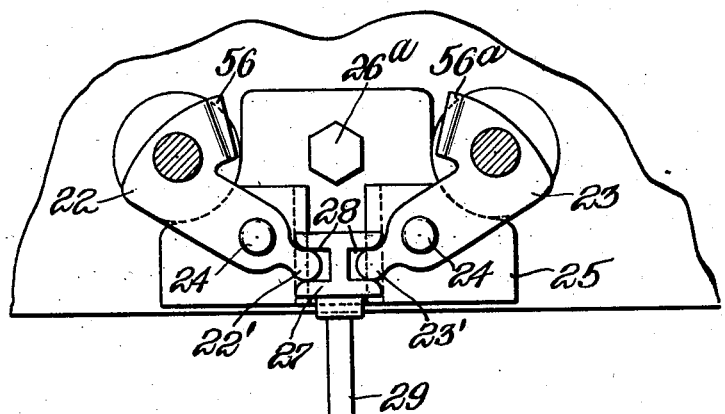
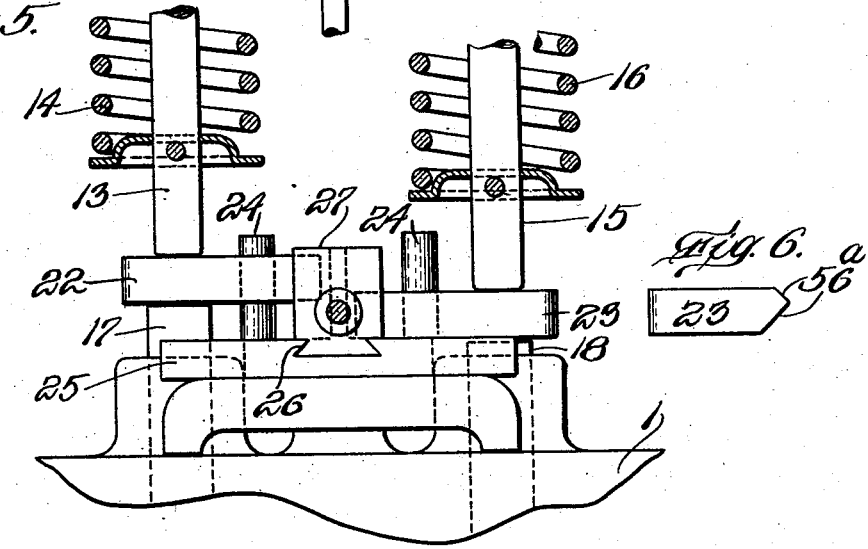

Patented Oct. 28, 1930

1,779,878

UNITED STATES PATENT OFFICE

PETER H. GUNDAL, OF BOSTON, MASSACHUSETTS

ENGINE

Application filed May 14, 1928. Serial No. 277,436.

My invention relates to motive power engines in general but particularly to internal combustion engines and it has for its object to improve the construction of the same to the end that the field of utility thereof shall be increased. It is also an object of this invention to provide a convertible internal combustion engine including two or more cylinders, or engine units, so organized and constructed as to have capacity for adjustment whereby one or more of the cylinders or engine units may be employed as air or other fluid pumping means while being driven by the other engine unit or units and whereby, under another condition of adjustment, all of the cylinders or engine units may be employed exclusively for power purposes.

To these ends I have provided an improved convertible internal combustion engine having the peculiar features of construction and mode of operation set forth in the following description, the several novel features of the invention being particularly pointed out and defined in the claims at the close thereof.

In the accompanying drawings:

Figure 1 is an elevation, more or less diagrammatic, of a compressed air system including an internal combustion engine constructed in accordance with my invention.

Figure 2 is an end elevation of the engine shown in Figure 1.

Figure 3 is a central vertical sectional view, on a larger scale, of the cylinder-head valve-fitting hereinafter described, showing also a part of the upper portion of the engine shown in Figure 1.

Figure 4 is a plan view of some of the parts of the engine valve-controlling mechanism hereinafter described.

Figure 5 is an elevation of the parts shown in Figure 4.

Figure 6 is a detail hereinafter described.

Having reference to the drawings, 1 represents the crank case of my improved internal combustion engine; 2 the crank shaft; 3, 4, 5 and 6 the four cylinders of the engine which are, as usual, cast in pairs. The two cylinders 3 and 4 are cast together and are also integral with a head 7, while the two cylinders 5 and 6 are cast together and are also integral with a head 8.

Each engine unit includes an intake valve 9 and exhaust valve 10, Figure 3, controlling communication between the compression chamber 13 of each unit and its intake port 11 and exhaust port 12, respectively.

As usual the stem 13 of each intake valve 9 is yieldingly urged downward by a spring 14, while the stem 15 of each exhaust valve 10 is yieldingly urged downward by a spring 16, the valves 9 being operated by the usual cam actuated push-rods 17 while the valves 10 are operated by the usual cam actuated push-rods 18. The cams which operate all these push-rods are fast on a cam shaft 19 that is driven through the usual gearing, not shown, from the crank shaft 2. The lower ends of the valve stems 13 and 15 of cylinders 3, 5 and 6 co-operate directly with their push-rods 17 and 18, that is, the push-rods which operate these stems are provided at their upper ends, as usual, with adjustable abutment screws 20 and check nuts 21, the tops of the heads of the push-rod screws 20 directly engaging the lower ends of the valve stems.

The push-rods 17 and 18 of the power unit including cylinder 4 normally act through abutment blocks or shims 22 and 23 pivotally and slidably mounted upon posts or guides 24 herein shown as pins projecting upwardly from an attachment bracket 25 fastened rigidly in position upon the engine frame by means of a screw 26ª. As herein shown this bracket 25 is in the form of a metal plate formed upon its top side with a groove or way 26 within which is mounted a slide 27, this slide being formed upon its opposite sides with vertical grooves 28 within which fit tail pieces 22' and 23' provided, respectively, on the abutment blocks 22 and 23.

Normally the outer free ends of the pivoted abutment members 22 and 23 occupy positions between the lower ends of the valve stems 13 and 15 of unit or cylinder 4 and their respective push-rods so that vertical reciprocation of said push-rods acts through the abutment members 22 and 23 to reciprocate the valve stems 13 and 15, the said abutment members 22 and 23 sliding vertically on the guide posts 24 so that they follow the movements of the push-rods.

When the slide 27 is moved inwardly along the way 26 it acts through the tail pieces 22' and 23' to swing the abutment members 22 and 23 on the guide posts 24 outwardly from their positions between the valve stems and the push-rods, and since these abutment members 22 and 23 are approximately the same in thickness as the length of movement of the push-rods 17 and 18, it will be clear that when the abutment members are thus placed in their inoperative positions the valve stems 13 and 15 will remain at rest although the push-rods continue to be reciprocated.

The slide 27 has rigidly fastened to it the inner end of a rod 29 whose outer end is pivotally connected at 30, Figure 2, to one arm of a bell-crank lever 31 fulcrumed at 32 upon a bracket 33 fastened to the crank case 1 of the engine.

It will be clear that vibration of bell-crank lever 31 will shift slide 27 on the bracket 25 so as to swing the abutment members 22 and 23 into and out of their operative positions.

The compression chamber 13 of the cylinder or unit 4 has its top wall made with a threaded aperture, Figure 3, into which is permanently screwed a bushing 34 that is interiorly threaded to receive within it an exteriorly threaded nipple 35 provided on the body 36 of an attachment fitting 37. The body 36 is made with three ports 38, 39 and 40, the port 38 being controlled by a valve 41; the port 39 being controlled by an outwardly opening check valve 42, and the port 40 being controlled by an inwardly opening check valve 43. The valve 41 normally fits against a seat 43 provided at the lower end of port 38 and is made with a stem 44 extending upwardly through a stuffing box 45, provided at the middle of the upper portion of the body 36, to the exterior of the latter where its upper end is provided with a hand wheel 46. The stem 44 is made with screw threads 47 in engagement with threads provided at 48 on body 36 so that by rotation of hand wheel 46, stem 44 and valve 41, the latter may be moved vertically toward or from its seat 43 to open or close the port 38.

Outside of the body 36 the valve stem 44 is provided with a collar 49 between which and the inner end of the hub of hand wheel 46 is arranged the inner forked end of a lever 50 fulcrumed at 51 on an arm 52 projecting from body 36. The outer end of lever 50 is also forked and embraces a block 53 slidably mounted upon a rod 54 pivotally connected at its lower end to one of the arms of the bell-crank lever 31. At its upper end the rod 54 has fast on it a stop collar 55 normally held against the top of block 53 by a spring 56 surrounding rod 54 which bears at its lower end against an abutment collar 57 on rod 54 and at its opposite end against the lower end of block 53.

Thus the vertically movable valve stem 44 is connected with the slide 27, Figures 4 and 5, through the medium of rod 29, bell-crank 31, rod 54 and lever 50 so that when said stem 44 is screwed downwardly to open valve 41 the slide 27, Figures 4 and 5, is moved inwardly on the bracket 25 thereby throwing the abutment members 22 and 23 outwardly into their inoperative positions. Also it will be clear that when the valve stem 44 is screwed upwardly to close the valve 41 it operates through lever 50, spring 56, abutment collar 57, rod 54, bell-crank 31 and rod 29 to move the slide 27 outwardly thereby restoring the abutment members 23 to their operative positions between their valve stems and push-rods.

As will later appear, the valve stem 44 and valve 41 are usually moved vertically while the engine is in operation and it will ordinarily or frequently happen that while the valve 44 is being closed and the abutment members 22 and 23 are being yieldingly urged toward their operative positions by the spring 56, the outer free end portions of the said abutment members will first come to bear against the sides of the vertically reciprocating push-rods 17 and 18, but owing to the yielding characteristic of the spring 56 this will not interrupt the upward movement of stem 44 and, as each push-rod comes into position at the limit of its downward movement, the spring 56 will snap the abutment members 22 and 23 into position under their valve stems 13 and 15, respectively. In order to facilitate the entrance of each abutment member between its valve stem and push-rod during this return movement its outer end portion is preferably beveled or made wedge-shaped as shown at 56ᵃ, Figure 6 showing an end view.

The port 39 of the fitting 37 is threaded to receive within it the exteriorly threaded two-part valve-holder 58 within which is provided a seat 59 for the check valve 42, while the port 40 is threaded to receive within it the valve holder 59 formed with a seat 60 for the check valve 43.

The check valve 43 is made with a stem 61 slidably mounted in a guide 62 that is part of holder 59 and this valve is normally held on its seat by a spring 63 bearing at one end against guide 62 and at its opposite end against an abutment washer or collar 64 which is held on the stem by a pin 65.

The valve 42 is made with a depending stem 66 slidably mounted within a guide 67 that is part of the lower section of the two-part holder 58, and upward movement of valve 42 is limited by a stop collar or washer 68 held on stem 66 by a pin 69.

The upper section of the two-part check valve holder 58 is made with an outlet port 70 connected by a nipple 71, elbow 72, nipple 73, coupling 74 and pipe line 75 with a storage tank 76, Figures 1 and 3.

In the pipe line 75 I provide a safety valve 77 and pressure gage 78.

The storage tank 76 is provided with an outlet controlled by a valve 79 and said valve may have connected with it one end of a flexible pipe or hose 80.

When the valve 41, Figure 3, occupies its closed position as shown the abutment members 22 and 23 are, as pointed out, caused to occupy their operative positions and when this is the case, and the engine is in operation, all four cylinders are delivering power to the crank shaft 2. Now, when the valve 41 is screwed downwardly while the engine is operating, thereby establishing communication between port 38 and the compression chamber 13, the abutment members 22 and 23 are simultaneously swung outwardly into their inoperative positions thus putting out of action the two valves 9 and 10 of cylinder or unit 4 at the same time that the valve 41 is opened.

It follows, therefore, that the reciprocatory movements of the piston (not shown) of unit or cylinder 4 will operate to draw air into fitting 37 and compression chamber 13 through port 40, past check valve 43, on each down stroke of the piston, and to force air from compression chamber 13 and fitting 37, through port 39, past valve 42 and into pipe line 75 which delivers it into the tank 76. Thus with valve 79 closed and the cylinder or unit 4 operated as a pump by the other three cylinders or units of the engine, it will continuously pump air from the atmosphere into tank 76. When the pressure within the tank 76 reaches the point for which the safety valve 77 is set the excess air pumped toward tank 76 will escape at said safety valve 77.

When it is desired to discontinue the pumping of air to tank 76 by the engine the valve 41 is screwed upwardly into its closed position whereupon cylinder or unit 4 will cease to operate as an air pump and will be restored to operation as a power unit. In this way the unit 4 is converted at will and while the engine is in operation, from a power unit into a fluid pumping unit that is operated by the remaining mechanism of the engine, and from a fluid pumping unit back to a power unit again.

From the above description it will be clear that the engine herein shown and described may be the propelling motor of an automobile, or other motor propelled vehicle, and that the tank 76 may be installed upon that vehicle. Thus I may provide a portable compressed air supplying system incorporated in an automobile, or other motor propelled vehicle, whose propelling motor is, as above described, convertible so that it can be made to serve two purposes, viz., as a power driven air compressor pump and as a vehicle propelling motor.

In practice of my invention I have incorporated the same in an automobile with the free end of the flexible hose or pipe 80 equipped with a pneumatically actuated tool for cutting stone, the usual course of procedure being to utilize the engine in its entirety to propel the vehicle thus equipped to the location where the stone cutting is to be done, and then after stopping the vehicle and throwing out the clutch thereof, opening the valve 41 while the engine is in operation and proceeding with the stone cutting operations, the pneumatic tool (not shown) at the free end of the pipe 80 being operated by the compressed air maintained in tank 76 by the converted engine while the cutting operations are carried out.

What I claim is:

1. An internal combustion engine of the character described comprising a plurality of engine units each including a cylinder having a head made with a compression chamber; an auxiliary port communicating with the compression chamber of one of said units; a storage tank for compressed air; a conduit connecting said storage tank with said auxiliary port; a check valve in said conduit opening toward said tank; an air inlet port connected with said auxiliary port; a check valve controlling said air inlet port and opening toward said auxiliary port; a normally closed valve controlling communication between the auxiliary port and both said air inlet port and said conduit; and means for rendering the intake and exhaust valves of said unit inoperative and maintaining the same in their closed positions when the valve controlling said auxiliary port is opened.

2. An internal combustion engine comprising a crank shaft; a plurality of engine units each including a cylinder having intake and exhaust controlling valves; means through which the intake and exhaust valves of each unit are operated by said shaft, the said means of one of said units being adjustable to provide for rendering its valves inoperative; an independent auxiliary air inlet for said unit; an inwardly opening check valve controlling said independent auxiliary air inlet; an independent auxiliary air outlet for said unit; an outwardly opening check valve controlling said auxiliary air outlet;

and valve means controlling communication between said auxiliary inlet and outlet and said cylinder, said means being adjustable to establish said communication when the operating means for the intake and exhaust valves of said unit is adjusted to render the same inoperative; and means connecting said two adjustable means to adjust them simultaneously.

3. An internal combustion engine comprising a crank shaft; a plurality of engine units each including a cylinder having intake and exhaust controlling valves; means through which the intake and exhaust valves of each unit are operated by said shaft, the said means of one of said units being adjustable to provide for rendering its valves inoperative; an independent auxiliary air inlet for said unit; an inwardly opening check valve controlling said independent auxiliary air inlet; an independent auxiliary air outlet for said unit; an outwardly opening check valve controlling said auxiliary air outlet, and valve means controlling communication between said auxiliary inlet and outlet and said cylinder, said means being adjustable to establish said communication when the operating means for the intake and exhaust valves of said unit is adjusted to render the same inoperative; and a single manually actuated member for simultaneously adjusting said communication controlling valve means and the valve operating means of said unit.

4. In an internal combustion engine of the character described the combination with the intake and exhaust valves of one of the engine units thereof, of operating means for said valves that is adjustable to render the same either operative or inoperative; a compression chamber for said unit made with an auxiliary port; a normally closed valve controlling said port; an auxiliary air inlet port connected with the auxiliary port of said compression chamber; an inwardly opening check valve controlling said air inlet port; an air outlet port connected with the auxiliary port of said compression chamber, and an outwardly opening check valve controlling the flow of air through said auxiliary air outlet port; and means operatively connected with said adjustable means and with said normally closed valve to move the latter valve from its seat and to simultaneously adjust said adjustable means to render said operating means inoperative.

5. In an internal combustion engine of the character described the combination with the intake and exhaust valves of one of the engine units thereof, of operating means for said valves that is adjustable to render the same either operative or inoperative; a compression chamber for said unit made with an auxiliary port; a normally closed valve controlling said port; an auxiliary air inlet port connected with the auxiliary port of said compression chamber; an inwardly opening check valve controlling said air inlet port; an air outlet port connected with the auxiliary port of said compression chamber, and an outwardly opening check valve controlling the flow of air through said auxiliary air outlet port; and a single manually actuated member through which said valve operating means and the valve controlling said compression port are simultaneously adjusted.

PETER H. GUNDAL.